United States Patent [19]
Griffiths et al.

[11] 3,932,180
[45] Jan. 13, 1976

[54] DIRECT ALPHA TO X PHASE CONVERSION OF METAL-FREE PHTHALOCYANINE

[75] Inventors: Clifford H. Griffiths, Brighton; Michael S. Walker, Penfield, both of N.Y.

[73] Assignee: Xerox Corporation, Stamford, Conn.

[22] Filed: June 4, 1973

[21] Appl. No.: 366,396

[52] U.S. Cl. .................. 96/1.5; 260/314.5; 117/34; 117/211; 117/215
[51] Int. Cl. ............................................ C09b 47/08
[58] Field of Search ...................... 260/314.5; 96/1.5

*Primary Examiner*—Harry I. Moatz
*Attorney, Agent, or Firm*—James J. Ralabate; James P. O'Sullivan; John H. Faro

[57] ABSTRACT

Process for direct alpha to X phase conversion of metal-free phthalocyanine. In this process, the alpha polymorph of a metal-free phthalocyanine pigment can be directly converted to the X form by depositing the alpha form of the pigment on a suitable substrate followed by in situ conversion of this deposit by controlled heating. The X form of metal-free phthalocyanine is known to possess good electrophotographic speed, and, thus, can be used either alone or in combination with other photoconductive materials in electrophotography.

16 Claims, 1 Drawing Figure

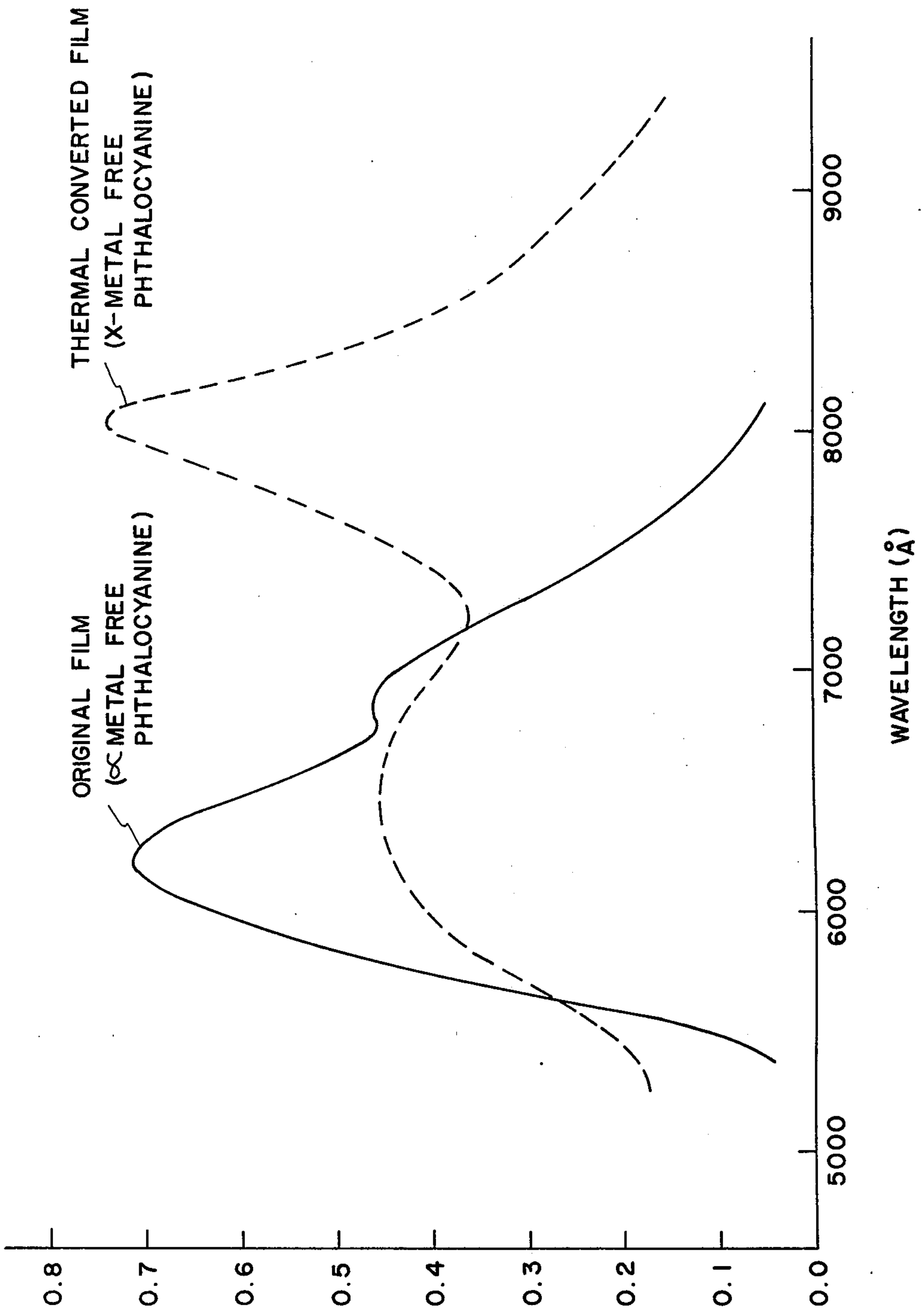
ORIGINAL FILM
(∝ METAL FREE
PHTHALOCYANINE)
THERMAL CONVERTED FILM
(X-METAL FREE
PHTHALOCYANINE)
0.0
0.1
0.2
0.3
0.4
0.5
0.6
0.7
0.8
5000
6000
7000
8000
9000
WAVELENGTH (Å)

DIRECT ALPHA TO X PHASE CONVERSION OF METAL-FREE PHTHALOCYANINE

BACKGROUND OF THE INVENTION

1. Field of the Invention

This invention relates to a process for preparation of electrophotographic pigments and the use of such pigments in electrophotographic imaging elements and methods. More specifically, this invention provides a novel route for the preparation of the X polymorph of metal-free phthalocyanine from the alpha form of this pigment.

2. Description of the Prior Art

The formation and development of images on the imaging surface of photoconductive materials by electrostatic means is well-known. The best known of the commercial processes, more commonly known as xerography, involves forming a latent electrostatic image on an imaging surface of an imaging member by first uniformly electrostatically charging the surface of the imaging member in the dark and then exposing this electrostatically charged surface to a light and shadow image. The light struck areas of the imaging layer are thus rendered conductive and the electrostatic charge selectively dissipated in these irradiated areas. After the photoconductor is exposed, the latent electrostatic image on this image bearing surface is rendered visible by development with a finely divided colored electroscopic powder material, known in the art as "toner". This toner will be principally attracted to those areas on the image bearing surface which retain the electrostatic charge and thus form a visible powder image.

The developed image can then be read or permanently affixed to the photoconductor in the event that the imaging layer is not to be reused. This latter practice is usually followed with respect to the binder-type photoconductive films where the layer is an integral part of the finished copy.

In so-called "plain paper" copying systems, the latent image can be developed on the imaging surface of a reusable photoconductor or transferred to another surface, such as a sheet of paper, and thereafter developed. When the latent image is developed on the imaging surface of a reusable photoconductor, it is subsequently transferred to another substrate and then permanently affixed thereto. Any one of a variety of well-known techniques can be used to permanently affix the toner image to the copy sheet, including overcoating with transparent films, and solvent or thermal fusion of the toner particles to the supportive substrate.

In the above "plain paper" copying systems, the materials used in the photoconductive layer should preferably be capable of rapid switching from insulative to conductive to insulative state in order to permit cyclic use of the imaging layer. The failure of the photoconductive material to return to its relative insulative state prior to the succeeding charging sequence will result in an increase in the rate of dark decay of the photoconductor. This phenomenon, commonly referred to in the art as "fatigue", has in the past been avoided by the selection of photoconductive materials possessing rapid switching capacity. Typical of the materials suitable for use in such a rapidly cycling imaging system include anthracene, sulfur, selenium and mixtures thereof (U.S. Pat. No. 2,297,691); selenium being preferred because of its superior photosensitivity.

In addition to anthracene, other organic compounds, such as phthalocyanine pigments, are also reportedly useful in electrophotography, see for example U.S. Pat. No. 3,594,163. These pigments can generally be classified into two major subgroups; the metal-free phthalocyanines and the metal-containing phthalocyanines. X-ray diffraction studies and/or infrared spectral analysis of these pigments indicate that phthalocyanines also exist in at least two different polymorphic forms; they being designated alpha and beta — (listed in order of increasing stability). In addition to these well-known forms of the metal-free and metal-containing phthalocyanines, additional polymorphs of the metal-containing phthalocyanines have also been recently reported, U.S. Patents 3,051,721 (R-form); 3,160,635 (delta-form); and 3,150,150 (delta-form).

More recently, an additional polymorph of the metal-free and metal-containing phthalocyanine pigments has been disclosed. This polymorph, being designated the X form, is described and methods for its preparation contained in U.S. Pats. Re. Nos. 27,117; 3,657,272; and 3,594,163. Comparative evaluation of the various forms of phthalocyanine pigments for use in electrophotography has revealed the X form to be preferred because of its superior electrophotographic speed. The potential use of this polymorphic form of phthalocyanine pigments in electrophotographic systems imposes stringent requirements on the purity of this material. It is, therefore, imperative that the techniques employed in synthesis of this form of pigment insure that the resulting product be free of impurities and/or other contaminates which can interfere with the electronic requirements of an electrophotographic imaging system.

Until recently, phthalocyanine has been prepared almost exclusively for use as a pigment, where color, tinctorial strength, light fastness, dispersability, etc. are prime considerations and the purity of the pigment being of only incidential importance. As a result of this emphasis, the reported methods for synthesis of these compounds very often introduce metals and/or other complex organic materials into the pigment which are very difficult to remove; see Moser and Thomas, Phthalocyanine Compounds, Reinhold Publishing Co., p.p. 104 – 189. Two of the more common methods used in the manufacture of phthalocyanine pigments generally involve (1) indirect formation of the pigment for an acid and a metal phthalocyanine containing a replaceable metal and (2) direct synthesis from phthalonitrile.

Accordingly, it is, the object of this invention to provide a process for preparation of the X form of metal-free phthalocyanine substantially free of the contaminants and impurities associated with its preparation by more conventional prior art techniques.

More specifically, it is the principal object of this invention to provide a process for the preparation of the X form of metal-free phthalocyanine from alpha metal-free phthalocyanine.

It is another of the objects of this invention to provide a process which is directive for the synthesis of the X form of metal-free phthalocyanine.

It is yet another object of this invention to provide a process which is directive for the preparation of the X form of metal-free phthalocyanine from the alpha form of metal-free phthalocyanine.

It is yet a further object of this invention to provide a process for the preparation of the X form of metal-free phthalocyanine in thin compact films.

SUMMARY OF THE INVENTION

The above and related objects are achieved by providing a process for the direct synthesis of the X form of metal-free phthalocyanine from the corresponding alpha form of metal-free phthalocyanine. This process comprises providing a substrate having deposited thereon alpha metal-free phthalocyanine; said deposit having a thickness of up to about 1400 A. This deposit is at least partially converted directly to the X form by heating at a rate in excess of from about 10 C° per minute to a temperature in the range of from about 220° to about 400°C. In the preferred embodiments of this invention, the alpha metal-free phthalocyanine deposit forms a thin compact film overlying at least one surface of the substrate. The average thickness of the alpha metal-free phthalocyanine deposit used in this process should preferably be less than about 1300 A and thermal conversion to the X polymorph carried out by heating at about 60C° per minute to a temperature of about 330°C.

BRIEF DESCRIPTION OF DRAWINGS

The FIGURE is a graphical illustration of the absorption spectrum of a vacuum deposited film of alpha metal-free phthalocyanine and the absorption spectrum of this same film after in situ thermal conversion to the X polymorph.

DESCRIPTION OF THE INVENTION INCLUDING PREFERRED EMBODIMENTS

According to the process of this invention, alpha metal-free phthalocyanine is deposited on a substrate material and thereafter thermally converted by controlled heating to its corresponding X polymorph. The metal-free phthalocyanine which can be used in the process of this invention is readily commercially available or can be prepared by any of the conventional techniques described in the technical literature; see for example Chapter 4 of the previously referenced Moser and Thomas publication. Prior to deposition of the phthalocyanine on the substrate it should be substantially free of impurities. For example, where this phthalocyanine is prepared directly from phthalonitrile, residual phthalonitrile can be readily removed by washing the phthalocyanine with acetone.

The metal-free phthalocyanine can then be deposited on an appropriate substrate by standard vapor deposition techniques. For example, in such procedures a measured quantity of alpha or beta metal-free phthalocyanine is placed in an open container or boat, the boat placed in a vacuum deposition chamber, a substrate positioned above the boat, the chamber sealed and evacuated to a pressure of less than $10^{-4}$ Torr. The temperature on the boat is then increased to about 400°C whereupon the phthalocyanine sublimes and deposits on the substrate. The quantity of the deposition is monitored and upon obtaining the desired amount of alpha metal-free phthalocyanine on said substrate, deposition is terminated by interposition of a shutter between the substrate and the boat. The substrate upon which the alpha metal-free phthalocyanine is deposited is maintained at ambient temperatures (approximately 20°C) during such deposition. The form of the deposit on the substrate will vary with the extent of such deposition. Ordinarily, where the deposition is terminated within a few seconds after the alpha metal-free phthalocyanine begins to collect upon the substrate, the deposit may appear as a discontinuous coating. On the other hand, where the deposition is allowed to proceed for about a minute the deposit will appear as a thin compact film. The thickness of such deposition is critical to the process of this invention and must be maintained within previously prescribed limits.

The precise chemical composition and geometry of the substrate used in the condensation of the alpha metal-free phthalocyanine does not appear to be critical, provided, that it is inert toward the alpha metal-free phthalocyanine and its corresponding X polymorph and thermally stable during the heating phase of this process. In the preferred embodiments of this invention, it is preferable that the substrate be nonhygroscopic and relatively transparent. Any one of a variety of materials possessing the above characteristics are suitable for use as substrates in this process; typical of such materials include quartz, tin oxide coated glass (NESA glass) and select plastic films (e.g. poly(N-vinylcarbazole).

The exposed surface of the alpha metal-free phthalocyanine deposit is then isolated or confined so as to insure the maintanence of a vapor pressure equilibrium between the deposit and the vapors emanating from said deposit during thermal treatment and yet preclude substantial evaporation of the deposit from the substrate during in situ thermal conversion to the X-polymorph. This confinement of the deposit can be achieved by simply placing a plate in contact with the deposit and maintaining this sandwich-like structure during the thermal treatment phase of this process. The composition of this plate is not believed to be critical, and good results have been obtained using materials similar to those employed as substrates. Of course, the physical geometry of the plate should be such as to afford maximum confinement of the deposit on the substrate.

Both the rate of heating the temperature to which the deposit is heated are critical in determining the direction and extent of conversion of the alpha metal-free phthalocyanine. For example, when such alpha metal-free phthalocyanine deposits are heated at a rate is excess of from about 10 to about 60C° per minute to a temperature in the range of from about 220° to about 400°C, direct conversion of the deposit to the X polymorph is observed. This conversion is manifest by a change in color and a transformation in the apparently structureless character of the deposit to one having a fine uniform grain. Where the rate of heating is below about 10C° per minute, substantial quantities of the alpha metal-free phthalocyanine are converted to the corresponding beta polymorph and the deposit takes on a nonuniform appearance. The formation of the beta polymorph within the alpha metal-free phthalocyanine deposit also appears to occur at temperatures in excess of about 400°C. At such elevated temperatures, there is a competitive formation of both the X and beta polymorphs and thus, the temperature of such thermal conversion chamber should be maintained below this upper level and preferably not in excess of about 330°C.

Where the thermal treatment step of this process is carried out in a combined differential thermal analysis - spectrophotometric cell, it is possible to monitor the absorption spectra of the phthalocyanine deposit before and immediately after thermal treatment without removal of the sample from the cell; cell design shown in REVIEW OF SCIENTIFIC INSTRUMENTS, Vol.

41, 1313 – 1315 (1970). FIG. 1 provides graphic illustration of such a shift in absorption spectra resulting from controlled thermal treatment of an alpha metal-free phthalocyanine film having a thickness of about 800 A.

The X form of metal-free phthalocyanine prepared as described above has rapid photoresponse in the red and near infrared regions of the spectrum and thus, can be used as the photoresponsive medium of an electophotographic imaging member. The X form of the pigment can be prepared directly on a conductive substrate, such as tin oxide coated glass, or subsequent to its preparation removed therefrom and dispersed in a film forming insulating resin and sprayed, draw or dip coated on a conductive substrate. The photoresponsive layer containing the X form of the phthalocyanine pigment can be overcoated with an insulating film in order to improve its charge storage characteristics. The rate of dark decay of such members may also be reduced by the interposition of a barrier layer between the photoconductive insulating layer and the conductive substrate. This barrier layer provides a blocking contact thus preventing premature injection from the conductive substrate into the photoconductive insulating medium. The electronic properties of this electrophotographic member require that the image bearing surface thereof have a resistivity in excess of about $10^{-10}$ ohm - centimeters. This insulating quality of the image bearing surface must be maintained even in the presence of an applied electric field.

In addition to the NESA glass type substrate previously disclosed, the X polymorph of metal-free phthalocyanine can be operatively disposed with respect to any one of a number of conductive substrates such as aluminum, brass, chromium or metalized plastic films. The electrophotographic imaging members prepared from these photoconductive materials and conductive substrates can be used in electrostatographic imaging systems. In such an electrostatographic imaging system, the imaging member comprises an imaging layer (generally containing the photoconductive material) operatively disposed in relation to the conductive substrate. This imaging layer is sensitized in the dark by the application thereto of a uniform electrostatic charge. Among the methods commonly employed for sensitization of this imaging layer include frictional charging or a discharge from a corona electrode. After the imaging layer is sensitized, it is selectively exposed to activating electromagnetic radiation thereby dissipating the charge on the light struck areas of said layer. The remaining charge pattern or latent electrostatic image is rendered visible by development with finely divided colored electroscopic particles, generally referred to as toner. This visible powder image can then be fused to the surface of the imaging layer or transferred to a receiving sheet. Fixation of the powder image is generally accomplished by solvent or thermal fusion techniques. Prior to a recycling of the electrostatographic imaging member residual toner particles remaining on the imaging layer are removed by a combination of neutralizing charging and mechanical means.

The Examples which follow further define, describe and illustrate preparation and use of the X polymorph of metal-free phthalocyanine. The techniques and equipment used in preparation, analysis and evaluation of the products of this process are standard or as hereinbefore described. Parts and percentages appearing in these Examples are by weight unless otherwise indicated.

EXAMPLE I

A measured quantity of alpha metal-free phthalocyanine is placed in a molybdenum boat, the boat inserted into a vacuum deposition chamber, and a quartz substrate 2 inches square by 0.125 inches thick suspended about 16 inches above the boat so that the face of the substrate is perpendicular to the base of the boat. The pressure within the chamber is then reduced to about $10^{-5}$ Torr and the temperature of the boat thereafter increased to about 400°C, thus, resulting in the vaporization of the alpha metal-free phthalocyanine. These vapors rise within the chamber, condensing on the substrate and thus form a thin compact, apparently structureless deposit of alpha metal-free phthalocyanine. Condensation of such vapors is continued until the deposit on the substrate reaches an average film thickness of about 800 A, whereupon a metal shutter is interposed between the boat and the substrate thereby preventing further deposition. Generally, the elapsed time between the initial vaproziation of the alpha metal-free phthalocyanine and the interruption of condensation with the metal shutter is somewhat less than one minute. The vacuum seal of the deposition chamber is then broken, the substrate bearing the alpha metal-free phthalocyanine deposit removed, a second quartz plate substantially the same as the substrate placed over and in contact with the deposit and the resulting sandwiched-like structure placed within a specially designed differential thermal analysis - spectrophotometric cell (of the type referred to previously). Once the sample is securred within the cell, the cell is sealed and the temperature therein increased at a rate of about 60C° per minute to a temperature of 330°C.

Spectral analysis prior and subsequent to such heat treatment evidences a shift in spectral sensitivity from the alpha to the X polymorph of metal-free phthalocyanine. The sample can be removed from the cell shortly after heating to the desired temperature or the sample and the cell allowed to cool prior to such removal. The two plates housing the sample are separated and a deposit examined under a light microscope at a magnification of 200X. The apparently structureless compact film of metal-free phthalocyanine now possesses a fine grain structure indicating thermal crystallization during the phase transformation of the metal-free phthalocyanine from the alpha to the X polymorph.

EXAMPLE II

The procedure of Example I is repeated, except for the heating of the sample at a rate of 10C° per minute to a temperature of 300°C. Spectrophotometric analysis of the film prepared in this manner indicates substantially complete conversion of the alpha metal-free phthalocyanine to the X polymorph. Some beta metal - free phthalocyanine is also detected, but only in very minor amounts. Examination of these films under the light microscope reveals some increase in grain size.

EXAMPLE III

The procedure of Example I is repeated, except for the heating of the sample at a rate of 5C° per minute to a temperature of 330°C. The size and randomness of distribution of crystals within the film is seen to increase dramatically and significant quantities of beta metal-free phthalocyanine are found to be present within the film.

EXAMPLE IV

The procedure of Example I is repeated, except for the heating of the sample to about 400°C. Here as in Example III, the size and randomness of crystals within the film is seen to increase dramatically and significant quantities of beta metal-free phthalocyanine are found to be present in the film. Apparently, the period of exposure of the film to such higher temperatures is a factor in determining the relative concentration of the X and beta polymorphs in the film; the more abbreviated the period of heating at such elevated temperatures, the less beta polymorph present in the film.

EXAMPLE V - VII

A series of samples are prepared according to the procedure of Example I, except for the condensation of the alpha metal-free phthalocyanine on the substrate until the average film thickness of such deposit is about 1300 A, 1400 A, and 1500 A respectively. Controlled heating of these samples produces the following results:

| Ex. No. | Film Thickness | Physical Appearance | Predominant Polymeric Form |
|---|---|---|---|
| V | 1300 A | fine uniform grain | X polymorph |
| VI | 1400 A | Some increase in grain size | X polymorph, some traces of beta |
| VII | 1500 A | sharp increase in grain | beta polymorph |

EXAMPLE VIII

The procedure of Example I is repeated, except for the failure to cover the sample with a second quartz plate prior to thermal treatment. Spectrophotometric evaluation of the sample indicates direct conversion of the sample from the alpha to the beta polymorph.

EXAMPLE IX

The procedure of Example I is repeated, except for the separation of the quartz cover plate from the sample by a 0.01 inch spacer and the maintenance of such separation during thermal treatment. Spectrophotometric evaluation of the sample indicates conversion of the sample directly from the alpha to the beta polymorph.

EXAMPLE X

The procedure of Example I is repeated, except for the sustitution of a tin oxide coated glass plate (NESA glass) for the quartz substrate. The phthalocyanine product obtained is equivalent to that obtained in Example I.

EXAMPLE XI

The procedure of Example I is repeated, except for the substitution of a 50 micron thick film of poly(N-vinylcarbazole) for the quartz substrate. The phthalocyanine product obtained is equivalent to that obtained in Example I.

EXAMPLE XII

The X metal-free phthalocyanine plate of Example X is evaluated for use as an electrostatographic imaging member on a Xerox Model D type copier adapted for acceptance of an imaging member of reduced dimensions. Charging, exposure and development sequences utilized in the copying cycle are standard. The reproductions made with this plate are of acceptable quality.

EXAMPLE XIII

The plate prepared as described in Example XI is placed in a vacuum deposition chamber and a 10 micron thick aluminum film vacuum deposited over the layer of X metal-free phthalocyanine. The resultant plate is removed from the chamber and evaluated for use as an electrostatographic imaging member in the same manner described in Example XII. The reproductions prepared with this plate are superior to those prepared in Example XII.

EXAMPLE XIV

The procedures of Example I are repeated except that the vacuum deposition of the alpha metal-free phthalocyanine is carried out at a pressure of about 30 Torr. As the metal-free phthalocyanine sublimes it is converted directly to the X form; nucleation and particle growth occurring in the vapor phase. These X metal-free phthalocyanine particles are collected on an appropriate substrate and subjected to spectrophotometric and light microscopic examination. Such tests confirm that the product is the X polymorph of metal-free phthalocyanine and that the deposit has a light fluffy microcrystalline structure characteristic of a particulate deposit.

EXAMPLE XV

The procedure of Example I is repeated, except for the formation of the alpha metal-free phthalocyanine deposit on the substrate by sublimation of the beta polymorph of metal-free phthalocyanine.

EXAMPLE XVI

This process also provides a unique method for forming thin compact binderless films from X metal-free phthalocyanine pigment particles. The procedure of Example I is repeated except for the substitution of the X polymorph of metal-free phthalocyanine for alpha form of this pigment in the molybdenum boat. Upon initiation of vacuum deposition, the X polymorph sublimes and thereafter condenses as a thin compact binderless deposit of the corresponding alpha polymorph. The alpha metal-free phthalocyanine deposit is then reconverted to the X form by controlled heating as per Example I.

What is claimed is:

1. A process for the direct thermal conversion of the alpha polymorph of metal free phthalocyanine to the corresponding X polymorph, said process comprising:

a. providing a substrate having deposited thereon alpha metal free phthalocyanine, said deposit having an average thickness of up to about 1400 Angstrom units;

b. confining said deposit by placing in contact therewith physical means the geometry of said means affording maximum confinement of the deposit on the substrate thereby insuring the maintenance of a vapor pressure equilibrium between the deposit and vapors emanating from said deposit thereby precluding substantial evaporation thereof during thermal conversion to the corresponding X polymorph; and c. heating said confined deposit at a rate in excess of about 10C° per minute to a temperature in the range of from about 220° to about 450°C so as to effect direct in situ conversion of at least some of the alpha metal free phthalocyanine to its corresponding X polymorph.

2. The process of claim 1, wherein the deposit of alpha metal free phthalocyanine has an average thickness of up to about 1300 A.

3. The process of claim 1, wherein said deposit is heated at a rate ranging from in excess of about 10C° per minute to about 60C° per minute.

4. The process of claim 1 wherein said deposit is heated to a temperature in the range of from about 220° to about 330°C.

5. The process of claim 1, wherein the alpha metal free phthalocyanine deposit is supported on a quartz substrate.

6. The process of claim 1, wherein the alpha metal free phthalocyanine deposit is supported on a conductive substrate.

7. The process of claim 1, wherein the alpha metal free phthalocyanine deposit is supported on a tin oxide coated glass substrate.

8. A process for the direct thermal conversion of the alpha polymorph of metal free phthalocyanine to the corresponding X polymorph, said process comprising:

a. providing a substrate having deposited thereon alpha metal free phthalocyanine, said deposit having an average thickness of up to about 1400 angstrom units;

b. confining said deposit by placing in contact therewith a plate-like member, the physical geometry of said member affording maximum confinement of the deposit on the substrate thereby insuring the maintenance of a vapor pressure equilibrium between the deposit and vapors eminating from said deposit thus precluding substantial evaporation thereof during thermal conversion to the X polymorph; and c. heating said confined deposit at a rate in excess of about 10°C per minute to a temperature in the range of from about 220° to about 450C° so as to effect direct in situ conversion of at least some of the alpha metal free phthalocyanine to its corresponding X polymorph.

9. The process of claim 8, wherein the deposit of alpha metal free phthalocyanine has an average thickness of up to about 1300 A.

10. The process of claim 8, wherein said deposit is heated at a rate ranging from in excess of about 10C° per minute to about 60C° per minute.

11. The process of claim 10, wherein said deposit is heated to a temperature in the range of from about 220° to about 330°C.

12. The process of claim 8, wherein the alpha metal free phthalocyanine deposit is supported on a quartz substrate.

13. The process of claim 8, wherein the alpha metal free phthalocyanine deposit is supported on a conductive substrate.

14. The process of claim 8, wherein the alpha metal free phthalocyanine deposit is supported on a tin oxide coated glass substrate.

15. The process of claim 8, wherein the alpha metal free phthalocyanine deposit is supported on a photoconductive substrate.

16. The process of claim 8, wherein the alpha metal free phthalocyanine deposit is supported on a film comprising poly(N-vinylcarbazole).

* * * * *